United States Patent [19]
Schaffa et al.

[11] Patent Number: 5,973,685
[45] Date of Patent: Oct. 26, 1999

[54] SCHEME FOR THE DISTRIBUTION OF MULTIMEDIA FOLLOW-UP INFORMATION

[75] Inventors: Frank Andre Schaffa, Hartsdale; David Israel Seidman, New York; Ahmed Nasr-El-Din Tantawy, Yorktown Heights, all of N.Y.

[73] Assignee: International Business Machines Corporation, Armonk, N.Y.

[21] Appl. No.: 08/888,574

[22] Filed: Jul. 7, 1997

[51] Int. Cl.⁶ ............................... H04N 7/10; H04H 1/00
[52] U.S. Cl. .............................. 345/328; 455/4.2; 348/12
[58] Field of Search ................................. 348/12, 7, 10, 348/13; 455/4.2; 345/327, 328; 395/200.48, 200.47

[56] References Cited

U.S. PATENT DOCUMENTS

| | | | |
|---|---|---|---|
| 4,536,791 | 8/1985 | Campbell et al. | 358/147 |
| 4,616,263 | 10/1986 | Eichelberger | 358/105 |
| 4,684,981 | 8/1987 | Toyoshima et al. | 358/86 |
| 4,924,303 | 5/1990 | Brandon et al. | 358/86 |
| 4,991,011 | 2/1991 | Johnson et al. | 358/141 |
| 5,208,665 | 5/1993 | McCalley et al. | 358/86 |
| 5,260,778 | 11/1993 | Kauffman et al. | 358/86 |
| 5,355,480 | 10/1994 | Smith et al. | 395/600 |
| 5,537,141 | 7/1996 | Harper et al. | 348/12 |
| 5,543,850 | 8/1996 | Pratt et al. | 348/617 |
| 5,550,578 | 8/1996 | Hoarty et al. | 348/7 |
| 5,557,316 | 9/1996 | Hoarty et al. | 348/7 |
| 5,557,724 | 9/1996 | Sampat et al. | 395/157 |
| 5,745,126 | 4/1998 | Jain et al. | 345/952 |
| 5,797,001 | 8/1998 | Augenbraun et al. | 395/609 |
| 5,818,441 | 10/1998 | Throckmorton | 345/328 |

*Primary Examiner*—Victor R. Kostak
*Attorney, Agent, or Firm*—Douglas W. Cameron; Ronald L. Drumheller

[57] ABSTRACT

A system architecture enables the distribution, to users connected to a digital broadcast medium, of supplementary information, which is presented and accessed in the context of the viewing of a video program. This ancillary, or "follow-up" information (FUI) is embedded in the same transport stream (digital multimedia broadcast stream) as the digital video and audio content. The FUI may take the form of video, audio or text. Alternatively, the transport stream may carry pointers to follow-up information (PFUI) instead of the information itself. In the latter case, the pointers are saved and used subsequently in the selection of FUI from a channel which carries data exclusively. In the former case, the user selects the FUI (supplementary information) which is to be extracted from the broadcast stream as it is transmitted.

10 Claims, 4 Drawing Sheets

# SCHEME FOR THE DISTRIBUTION OF MULTIMEDIA FOLLOW-UP INFORMATION

DESCRIPTION

1. Technical Field

A method and apparatus for distributing supplementary information in a multimedia broadcast stream.

2. Description of the Prior Art

The advent of digital video distribution, replacing analog video distribution, enables a number of advances in the quality and content of the material which can be broadcast to the home. Using broadcast media such as satellite transmission lines and the wide-reaching Cable Television (CaTV) infrastructure, broadcasters can offer users a wide range of services, far exceeding (in quality and quantity) the services possible in all-analog distribution systems. In addition to increasing the number of video channels which can be made available to the viewer, the digital distribution system enables many data-related services.

In U.S. Pat. No. 4,862,268, a control system for addressable cable television is disclosed which permits the transmission of data using a video format, in an analog television signal. The data is transmitted during the analog signal's vertical blanking interval. Other patents (including U.S. Pat. No. 4,536,791 and U.S. Pat. No. 5,543,850) utilize the vertical blanking interval as well, to transmit data along with the video stream For the distribution of digital video, U.S. Pat. No. 5,512,935 and others utilize a set-top box at the user's premises, for interfacing with the digital distribution system. Downstream content (from the "head-end" to the user) utilizes the broadcast medium, such as the CaTV system, while upstream content (user requests) utilize the public switched telephone network. Users interface with the set-top box, which is connected to the television, personal computer, and home controller.

Systems for embedding additional control, graphics, and text information in digital video streams have been invented (e.g. U.S. Pat. No. 5,260,778.) Messages are sent from an addressable controller to the terminal of a subscriber (or group of subscribers) for on-screen display. When text is accessed, the display may switch to a full-screen text display, or continue to display the video with a text overlay.

The requirement of an upstream channel for the transmission of user requests to the head-end adds expense to the user's equipment and complexity to the head-end equipment, which must handle requests from a large number of users, with adequate response time. User-addressable data is primarily text, and a system which can deliver supplementary data of all types to users, without the need of an upchannel for requests, represents a significant advancement in data-related services to the home.

SUMMARY OF THE INVENTION

The invention is a system architecture which enables the delivery of extensive supplementary information to the viewer of a video program which is digitally broadcast. More specifically, it provides the means by which supplementary information can be embedded in the video audio stream which is broadcast, and how it can be presented to and extracted by the interested viewer without an upstream channel.

Accordingly, with this invention supplementary information is embedded in a digital multimedia broadcast stream, where the supplementary information is related to the subject matter of the multimedia stream on a frame by frame basis and is associated with specific frames of the broadcast stream. Upon receiving the broadcast stream, a user selects a number of units of the supplementary information, and these selected units are extracted from the broadcast stream by demultiplexing at the user's end without transmitting upstream selection information.

This supplementary information could be extracted from the broadcast stream as it is being transmitted. Alternatively, the supplementary information could comprise pointers to other information which may be transmitted to the user on a separate data channel at a later time.

BRIEF DESCRIPTION OF THE DRAWINGS

FIG. 3 details the first phase of access, in which the user stores the PFUI which are embedded in the program, for subsequent use. FIG. 4 details the second phase, in which the PFUI are used to select the desired FUI from among the data which is broadcast on a channel dedicated to data (i.e. FUI) transmission.

DESCRIPTION OF THE PREFERRED EMBODIMENT

There are two modes available for the access of FUI by the user. In the first mode, "immediate access" mode, the FUI is embedded in the video/audio broadcast stream, and is accessed directly by the user during the viewing of a program on a video channel. In the second mode, "delayed access" mode, PFUI are embedded in the digital stream which is broadcast on the video channel. These pointers are stored by the interested viewer for subsequent use. When desired, the viewer tunes to a data channel, and uses the PFUI to access the FUI which are broadcast there. The following discussion first describes immediate access mode, then describes delayed access mode.

Immediate Access Mode

Figure 1:
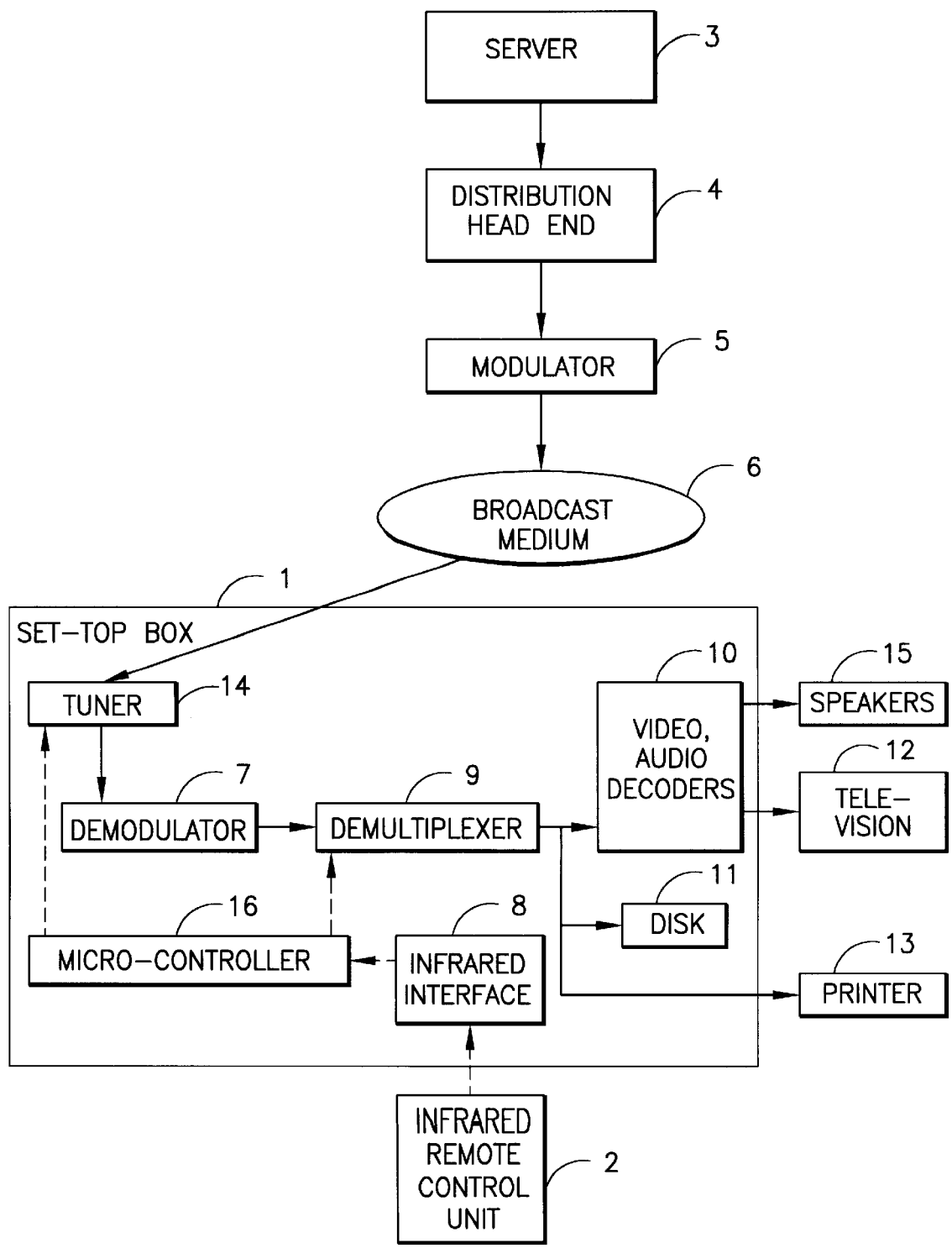
FIG. 1 is a block diagram of the network architecture required for the distribution of FUI in digital video broadcasts. The bold-type arrows indicate data flow (including audio and video). Dotted arrows indicate control.

Referring to FIG. 1, programs are pre-stored in a server, which can be of "push" or "pull" type. The programs stored on the server have been previously edited to add data content (i.e. "supplementary information") to their video and audio content (i.e. "base information".) The embedded data is coordinated with the video content at the time of editing, by the placement of data items related to the video subject (and the messages which notify users of their availability) in proximity to the video frames displaying that subject. Using known digital video editing techniques, supplementary information can be placed in the stream exactly prior to a given video frame.

For example, a data file containing extensive product information can be embedded in video of a commercial message for that product. Thus, the programs on the server which are FUI-enhanced contain video, audio, and data content.

A distribution head-end controls the scheduling of the broadcast of a selection of the programs stored on the server.

When a program is scheduled for broadcast, the head-end requests its transmission from the server. The head-end also handles the multiplexing of this program with other programs from this and other servers.

The head-end connects to a broadcast medium 6 via a modulator 5, which converts the digital output of the head-end's multiplexer into an analog signal to be broadcast on a segment of the medium's available bandwidth.

At the user's premises, in addition to a television unit 12 and an infrared remote control unit 2, the user who wishes to access the FUI embedded in the digital broadcast stream must have a FUI-capable set-top box 1 as shown in FIG. 1, or a personal computer (PC) with an adapter card with the functions described here for the STB. (We will refer to this unit, PC with adapter or stand-alone set-top, as the STB.) A printer is optional, for users who wish to be able to print FUI (in addition to or instead of downloading it.)

The elements in the set-top box (STB) are the following. The signal from the broadcast medium goes first to a tuner 14, which allows the user, using the infrared remote control unit to tune to the desired channel. The signal then goes to a demodulator 7, which performs the reverse function of the modulator, and yields a digital bitstrearm This bitstream contains the programs intended for all of the users who are connected to the shared broadcast medium. In order to separate the user's desired program from the others, a demultiplexer 9 is used, and yields a single program bitstream, containing video, audio, and embedded data related to the video content.

Video and audio content are relayed to video and audio decoders 10 which decompress the encoded content and convert it back into analog form. The analog audio signal goes to the television's audio inputs or to optional speakers 15.

The analog video signal goes to the television. The video decoder also handles the display of the "on-screen display" bitmaps used to notify the viewer of the availability of the FUI. Audio messages are handled by the audio decoder.

A microcontroller 16 in the STB monitors the incoming data in the stream. When a data availability message arrives, the microcontroller displays it to the user in video or audio form. The data availability message can be an on-screen symbol (or icon), on-screen text (stationary or scrolling) or an audio notification such as a beep. The microcontroller monitors the queue which is set up for data, and distinguishes via data flags preceding the data whether a unit of data is a message, screen region information, or the supplementary data itself The user, if he wishes, reacts to the availability message by requesting the FUI offered in the message by use of the infrared remote control unit. The infrared interface 8 of the STB 1 reacts to the request by sending a control signal to microcontroller 16, which in turn sends another control signal to demultiplexor 9 which demultiplexes the FUI from the digital multimedia broadcast stream. This extraction of the FUI occurs after the digital multimedia broadcast stream has passed through tuner 14 which is controlled by the microcontroller 16 in response to signals from the infrared control unit 2. Based on the user's request, the FUI may be routed to a printer 13, a disk 11, or directly to the audio and/or video decoder(s) (in the case of audio and/or video FUI content). It should be noted that a FUI-capable STB could be constructed which did not contain a disk, in order to reduce cost. In this case, the FUI could only be displayed or printed.

Figure 2:
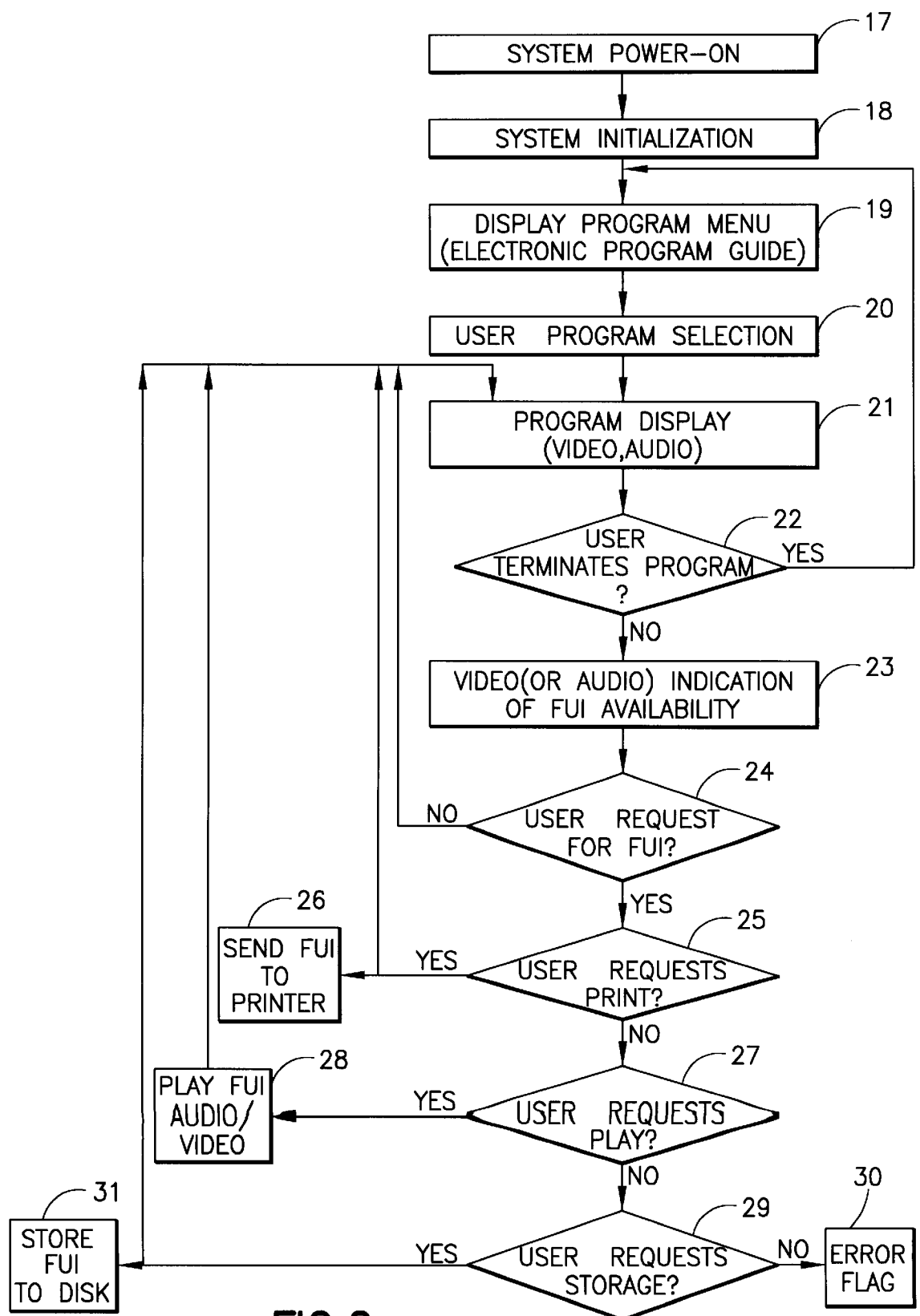
FIG. 2 is a flowchart detailing the steps required for user access to FUI, in the "immediate access" mode.

FIG. 2 illustrates the steps taken in accessing supplementary information in the immediate access mode.

Upon power-on 17 of the user's system by the user, the system initializes itself 18, also known as the electronic program guide. The user makes a selection 20 from among the choices displayed. In response, the system displays 20 the video and audio of the selected program. The user may terminate the program 22 at any time, at which point the display of the program menu 18 is resumed.

During the course of the program, the system will indicate 23 to the user that FUI is available, using "data availability messages" as described in the Description of the Preferred Embodiment. If the user responds to this indication by requesting the FUI 24, he is further prompted as to the disposition of the FUI. If a printout is requested (25), the FUI is sent (26) to the printer. If the user requests that the FUI be played (27), the FUI is sent to the appropriate decoding device for play (28). If the user requests that the FUI be stored (29), the FUI is stored (31) on the disk, or other storage medium.

If the user has requested the FUI but has not selected on of the above mentioned dispositions, an error has occurred, and an error flag (30) is displayed.

Delayed Access Mode

In the case of delayed access mode, PFUI, rather than FUI, are embedded in the streams which are stored on the server. The system works as described above, in the discussion of immediate access mode, up to the point of the availability message (see FIG. 3). In delayed access mode, the availability message indicates that it is PFUI (pointers to follow-up information), rather than FUI, which is available. An on-screen text or symbol, or audio message indicates that FUI or PFUI is available. The interested user downloads the PFUI to storage (RAM or disk 11.)

At a later time, the user utilizes the PFUI to access FUI (see FIG. 4). The user tunes the STB 1 to a data channel, rather than a channel showing video programs. The data channel broadcasts the data items which are the FUI for all of the programs which have been broadcast on the medium in the recent past. When tuned to the data channel, the PFUI stored in the user's disk are read by the microcontroller 16, which programs the demultiplexer 9 to demultiplex the desired FUI from among the FUI offered on the data channel. The FUI is then routed to printer 9, disk 11, or decoder(s) 10.

It should be noted that the FUI system as described above is usable in cases where only a fraction of the users connected to the shared broadcast medium are FUI-capable. Non-FUI-capable users decode video and audio as they do for any digital broadcast stream, and ignore the data availability messages and the data itself.

Because of the high bit rates requirements of digital video, a compression method is usually applied to video before transmission over a network. In the preferred embodiment, video (and audio) content are compressed using MPEG-2 (Motion Pictures Experts Group) compression, as specified in ISO/IEC 13818-2 for video and ISO/IEC 13818-3 for audio. Typical bit rates for compressed MPEG-2 video streams range from 3 to 15 Mbps.

The MPEG-2 standard also specifies how programs (consisting of audio and video elementary streams) can be multiplexed together in a "transport stream". This is specified in the MPEG-2 Systems Specification, ISO/IEC 13818-1. The MPEG-2 Systems Specification accommodates the inclusion in a program's transport stream of non-video and non-audio streams, by use of "private data" streams. All transport stream packets, regardless of content, are of a uniform size (188 bytes) and format. "Program-Specific Information", which is also carried in the transport stream, carries the information regarding which elementary streams have been multiplexed in the transport stream, what type of content they carry, and how they may be demultiplexed.

The FUI-enhanced MPEG-2 transport streams are fully MPEG-2 compliant. Since data is carried in the private data streams, systems which are not designed for the transmission of FUI can utilize these streams as usual—i.e. utilizing only the video and audio content, and ignoring the data content. Because of the high bit rates associated with MPEG-2 video, the additional bandwidth required for the transmission of FUI is negligibly small.

MPEG-2 demultiplexers, MPEG-2 audio decoders and MPEG-2 video decoders are now widely available. The preferred embodiment uses these integrated circuits (IC) in the FUI-capable STB to perform the functions indicated in the block diagram of FIG. 1. If not incorporated in the audio and video decoder, an intermediate IC is necessary at the output of the decoders to convert from digital to analog and, in the case of video, encode to the desired video analog signal format (such as NTSC, PAL, or SECAM.) S-video output from these IC's is optional.

A microprocessor programs the MPEG-2 demultiplexer to create a queue for FUI, in addition to those created for audio and video packets. The FUI queue is monitored by the microprocessor by polling or interrupts. When this queue is found to be non-empty, its contents are read by the microprocessor. If they are message packets, their content is converted into bitmaps for on-screen display. This display involves the microprocessor programming the video decoder as to the location, size, and other parameters of the bitmap. The viewer may disable the display of data availability messages.

If the data found in the FUI queue is not a message (i.e. it is supplementary information or PFUI), its disposal depends on the choice of the viewer. If the microprocessor receives an interrupt from the IR interface indicating that the viewer wishes to access the data, it is routed to the specified device (printer, disk, or audio/video decoder). If not, the data is left in the queue and is eventually overwritten.

In the preferred embodiment, the audio signal is encoded and decoded as two channels (with the additional option of Dolby noise reduction and surround sound) and requires multiple speakers at the STB output.

The broadcast medium to be used in the transmission of the FUI-enhanced streams is a cable or satellite infrastructure, in the preferred embodiment. Modulation methods, such as VSB (Vestigial SideBand) and QAM (Quadrature Amplitude Modulation) are used, and can currently modulate up to 40 Mbps onto a single 6 MHz band of the available analog spectrum. Chipsets for QAM or VSB modulation/demodulation are widely available, incorporating Reed-Solomon encoding and forward error correction.

The FUI system as described above can be used in current cable and satellite distribution systems, since the FUI-enhanced streams are fully MPEG-2 compliant. Existing STB's which can decode MPEG-2 digital streams will not be adversely affected by the FUI streams. Thus FUI service can be introduced in existing distribution system which have some users with FUI-capable STB's and others with non-FUI-capable STB's.

Figure 3:
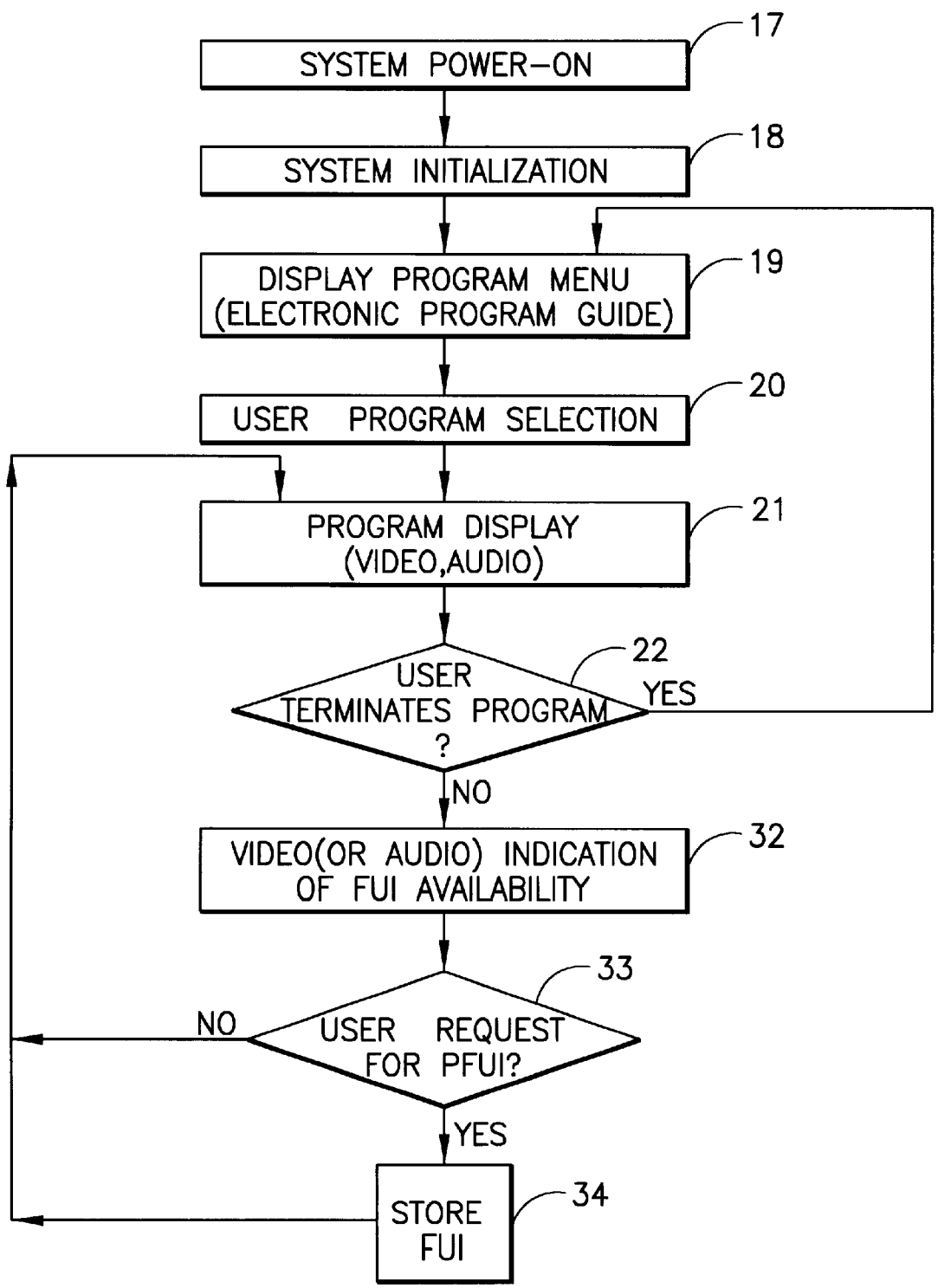
FIGS. 3 and 4 are flowcharts detailing the steps required for user access of FUI by use of PFUI (pointers to follow-up information), i.e. access in "delayed access" mode (see below).

FIG. 3 illustrates the steps taken in accessing supplementary information in the first part of the delayed access mode, that is, the process by which the user is offered and selects pointers to FUI.

System power-on, initialization, program menu display, user program selection, program display, and program termination proceed as described in the description for FIG. 2 above.

In the case of delayed access mode, the system indicates to the user that PFUI are available, during the course of the program (32). If the user requests access to the PFUI (33), they are stored (34) in the set-top box's storage medium, for later use.

Figure 4:
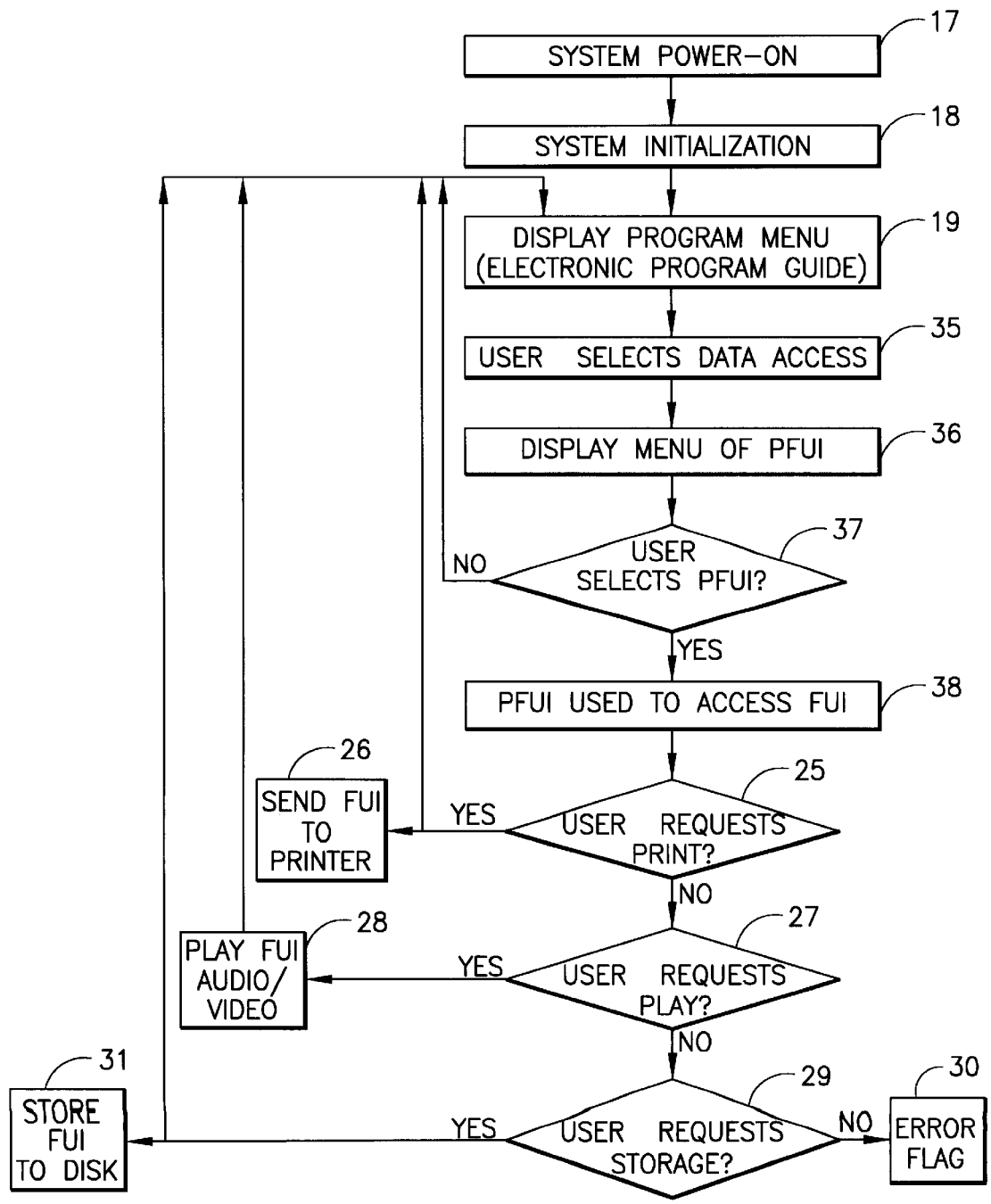

FIG. 4 illustrates the steps taken in accessing supplementary information in the second part of the delayed access mode, that is, the process of which the user utilizes the stored PFUI to access FUI. System power-on, initialization, and program menu display proceed as described in the description for FIG. 2 above.

The user interested in accessing FUI by use of stored PFUI selects (35) a data access channel from the program menu. The system displays the data available on this channel for which the user has PFUI, i.e. the PFUI menu (36). If the user selects one of the PFUI (37), the pointer is used to access the FUI (38). Once accessed, the disposition of the FUI is handled as in the case of immediate access mode, as illustrated in 25–31 of FIG. 2 and described above.

Having thus described our invention, what we claim as new and desire to secure by Letters Patent is:

1. A method for distributing supplementary information to users of a digital multimedia broadcast stream at receiver locations, said method comprising the steps of:

broadcasting supplementary information to receiver locations of said multimedia stream, said supplementary information being related to subject matter of said multimedia stream on a frame by frame basis, said supplementary information being associated with a specific group of frames of said multimedia stream and including an availability message for notifying users of the availability of said supplementary information;

upon receiving said digital multimedia broadcast stream at a receiver location, automatically displaying said availability message to a user of said receiver at the same time that the specific group of frames associated therewith is being displayed to said user;

indicating whether or not the user has interest in the supplementary information during display of the availability message associated therewith through use of a television infrared remote control operated by said user;

if the user indicates interest during the indicating step, receiving and storing the supplementary information associated with said availability message for later or immediate viewing or printing by said user, and if the user does not indicate interest, not storing said supplementary information, said storing of said supplementary information occurring without transmitting user interest indication information upstream.

2. A method as recited in claim 1, wherein said supplementary information comprises at least one pointer to other information.

3. A method as recited in claim 2, wherein said pointer points to data in said digital multimedia broadcast stream or to data in another digital multimedia broadcast stream.

4. A method as recited in claim 1, wherein said supplementary information comprises messages informing a user of the availability of other units of said supplementary information.

5. A method as recited in claim 1, wherein said supplementary information does not interfere with base information being transmitted in said digital multimedia broadcast stream.

6. A method as recited in claim 1, wherein said availability message is automatically displayed to a user as text on the same viewing screen and at the same time as the associated group of specific frames are being displayed to the user.

7. A method as recited in claim 1, wherein said availability message is automatically displayed to a user as an icon displayed on the same viewing screen and at the same time as the associated group of specific frames are being displayed to the user.

8. A method as recited in claim 1, wherein said availability message is automatically displayed to a user as an audio notification at the same time as the associated group of specific frames are being displayed are being displayed to the user.

9. A broadcast system for transmitting a digital multimedia broadcast stream from a headend to a plurality of subscribers in communication with said headend, said system comprising:

- a transmitter for transmitting supplementary information in said digital multimedia stream in addition to base audio and video information, said supplementary information being associated with specific frames of said base audio and video information in said stream, said supplementary information including availability messages for notifying subscribers of the availability of said supplementary information, each one of said availability messages being associated with a particular group of frames of said base audio and video information;
- means for automatically displaying each availability message to a subscriber at the same time that the particular group of frames associated with said each availability message is being displayed to said subscriber;
- television infrared remote control means for identifying specific availability messages by a subscriber while said specific availability messages are being displayed to said subscriber; and
- means responsive to identification of each specific availability message by the subscriber for receiving and storing broadcasted data associated with said each specific availability message for later or immediate viewing or printing by said subscriber without transmission of upstream subscriber selection information, broadcasted data associated with availability messages not identified by the subscriber being not stored for viewing or printing by said subscriber.

10. A method for distributing supplementary information to users of a digital multimedia broadcast stream, said method comprising the steps of:

a. multiplexing the digital multimedia broadcast stream with a private data stream containing the supplementary information to produce a multiplexed MPEG digital data stream;

b. broadcasting the MPEG digital data stream to the users of said digital multimedia stream, said supplementary information being related to subject matter of said digital multimedia stream on a frame by frame basis, said supplementary information including availability messages and data associated with each availability message, said each availability message being associated with a specific group of frames of said digital multimedia stream;

c. upon receiving said MPEG digital data stream at a receiver location, automatically displaying said each availability message to a user of said receiver on the same viewing screen and at the same time as the specific group of frames associated with said each availability message is being displayed to said user;

d. identifying specific ones of said availability messages during display thereof using a television infrared remote control operated by said user; and in response to said identifying step, receiving and selectively storing for later or immediate viewing or printing by said user the data associated with the specific ones of said availability messages identified by said user, the data associated with availability messages not identified by said user being not stored for viewing or printing by said user, said receiving and selective storing occurring without transmitting upstream user selection information.

\* \* \* \* \*